United States Patent
Noguchi

(10) Patent No.: US 12,528,545 B2
(45) Date of Patent: Jan. 20, 2026

(54) VEHICLE BODY STRUCTURAL MEMBER

(71) Applicant: SUBARU CORPORATION, Tokyo (JP)

(72) Inventor: Masaharu Noguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 312 days.

(21) Appl. No.: 18/165,638

(22) Filed: Feb. 7, 2023

(65) Prior Publication Data

US 2023/0264760 A1 Aug. 24, 2023

(30) Foreign Application Priority Data

Feb. 24, 2022 (JP) ................................. 2022-026360

(51) Int. Cl.
*B62D 29/04* (2006.01)
*B62D 21/15* (2006.01)
*B62D 25/04* (2006.01)

(52) U.S. Cl.
CPC ......... *B62D 29/043* (2013.01); *B62D 21/157* (2013.01); *B62D 25/04* (2013.01)

(58) Field of Classification Search
CPC ...... B62D 21/157; B62D 25/04; B62D 29/04; B62D 29/043; B62D 29/046
See application file for complete search history.

(56) References Cited

U.S. PATENT DOCUMENTS

| | | | | |
|---|---|---|---|---|
| 5,671,968 A | * | 9/1997 | Masuda ............... | B62D 25/025 296/210 |
| 8,366,183 B2 | * | 2/2013 | Ishigame ............... | B62D 25/04 296/193.06 |
| 8,480,163 B2 | * | 7/2013 | Mori .................... | B62D 25/04 296/193.06 |
| 11,279,414 B2 | * | 3/2022 | Kim ..................... | B62D 29/043 |
| 2005/0023862 A1 | * | 2/2005 | Saeki .................. | B62D 25/2036 296/187.12 |
| 2008/0185874 A1 | * | 8/2008 | Kimoto .................. | B32B 27/18 296/203.01 |

(Continued)

FOREIGN PATENT DOCUMENTS

| | | |
|---|---|---|
| DE | 102017200019 A1 | 7/2017 |
| JP | 2005-239132 A | 9/2005 |
| JP | 2013-193637 A | 9/2013 |

OTHER PUBLICATIONS

Office Action mailed Nov. 11, 2025 for Japanese Patent Application No. 2022-026360 (2 pages in Japanese; 3 pages English translation).

*Primary Examiner* — Gregory A Blankenship
(74) *Attorney, Agent, or Firm* — Smith, Gambrell & Russell, LLP

(57) ABSTRACT

A vehicle body structural member is formed from a fiber-reinforced resin composite. The vehicle body structural member includes a break scheduled part. The break scheduled part is provided on a load input surface to which a collision load is expected to be input. The break scheduled part is configured to, when the collision load is input, undergo a brittle fracture and divide the load input surface into a first region and a second region on both sides respectively in a predetermined first direction. When the collision load is input, a torsion is generated in each of the first region and the second region across the break scheduled part have torsions.

10 Claims, 5 Drawing Sheets

(56) References Cited

U.S. PATENT DOCUMENTS

| | | | | |
|---|---|---|---|---|
| 2010/0194146 | A1* | 8/2010 | Nishimura | B62D 25/04 |
| | | | | 296/193.06 |
| 2016/0059904 | A1* | 3/2016 | Kerscher | B62D 29/043 |
| | | | | 296/187.03 |
| 2016/0356334 | A1* | 12/2016 | Onoue | B60R 19/03 |
| 2017/0073017 | A1* | 3/2017 | Steffens | B62D 25/04 |
| 2017/0188650 | A1 | 7/2017 | Hector, Jr. et al. | |
| 2018/0118279 | A1* | 5/2018 | Lee | B62D 29/043 |
| 2019/0048962 | A1* | 2/2019 | Wuest | B29C 70/24 |
| 2019/0359261 | A1* | 11/2019 | Kosaka | B62D 25/04 |
| 2021/0309296 | A1* | 10/2021 | Ito | B32B 7/08 |
| 2021/0323614 | A1* | 10/2021 | Frost | B62D 25/04 |
| 2021/0355288 | A1 | 11/2021 | Chan et al. | |
| 2022/0332372 | A1* | 10/2022 | Schnapp | B21D 22/26 |
| 2023/0182819 | A1* | 6/2023 | Hirose | B62D 25/08 |
| 2023/0264748 | A1* | 8/2023 | Ito | B62D 27/065 |
| | | | | 296/193.05 |
| 2024/0034044 | A1* | 2/2024 | Ookubo | B32B 7/12 |

* cited by examiner

VEHICLE BODY STRUCTURAL MEMBER

CROSS-REFERENCE TO RELATED APPLICATIONS

The present application claims priority from Japanese Patent Application No. 2022-026360 filed on Feb. 24, 2022, the entire contents of which are hereby incorporated by reference.

BACKGROUND

The disclosure relates to a vehicle body structural member of a motor vehicle using a fiber-reinforced resin composite.

For weight reduction of a vehicle body of a vehicle such as a passenger vehicle, it has recently been considered to manufacture a vehicle body structural member such as a center pillar using a fiber-reinforced resin typified by a carbon fiber-reinforced resin (hereinafter, "CFRP"). The structural member made of the fiber-reinforced resin has high rigidity and exhibits high strength particularly against compressive stress or tensile stress acting in a fiber orientation direction. Even when the structural member for the vehicle body is configured using the fiber-reinforced resin, it is desired to ensure the rigidity to resist a collision, a joint strength for joining with other components of the vehicle, and the like (See, for example, Japanese Unexamined Patent Application Publication 2013-193637).

SUMMARY

An aspect of the disclosure provides a vehicle body structural member formed from a fiber-reinforced resin composite. The vehicle body structural member includes a break scheduled part. The break scheduled part is provided on a load input surface to which a collision load is expected to be input. The break scheduled part is configured to, when the collision load is input, undergo a brittle fracture and divide the load input surface into a first region and a second region on both sides respectively in a predetermined first direction. When the collision load is input, a torsion is generated in each of the first region and the second region across the break scheduled part have torsions.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

DETAILED DESCRIPTION

A fiber-reinforced resin is far lower in ductility and far smaller in an absorbed amount of collision energy during an input of a collision load than a metal member such as an iron member.

Therefore, it is desirable to provide a vehicle body structural member using a fiber-reinforced resin composite and capable of improving characteristics for absorbing collision energy.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

1. Outline of Vehicle Body Structure

An outline of a vehicle body structure with a vehicle body structural member according to an embodiment of the disclosure will first be described.

Figure 1:
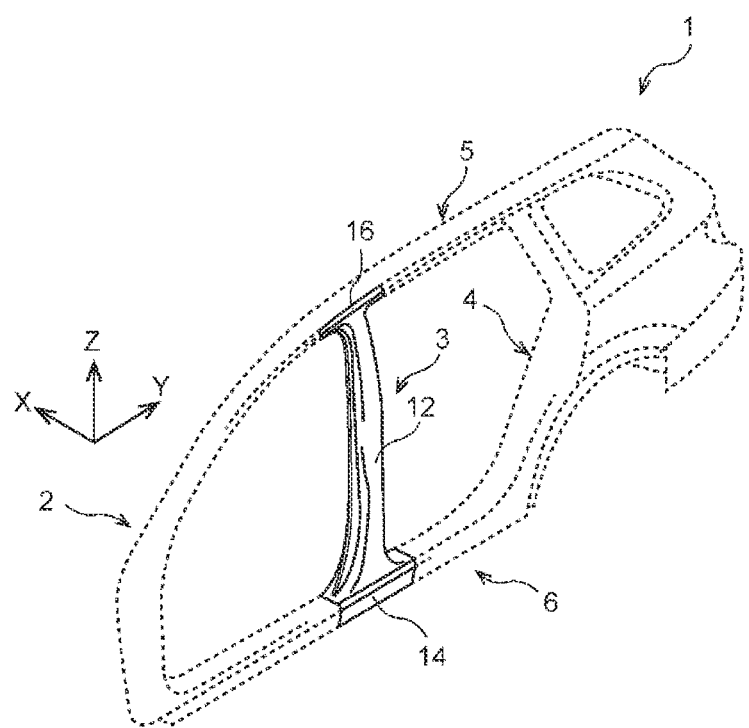
FIG. 1 is a schematic diagram illustrating overall configurations of a vehicle body side structure according to an embodiment of the disclosure.

FIG. 1 is a schematic diagram illustrating an appearance of a vehicle body side structure 1. The vehicle body side structure 1 illustrated in FIG. 1 is a schematic view of part of a left side structure of a vehicle. As illustrated in FIG. 1, in the present specification, a vehicle width direction may be denoted as an X direction, a vehicle body longitudinal direction (vehicle length direction) may be represented as a Y direction, and a vehicle height direction may be denoted as a Z direction.

The vehicle body side structure 1 is configured with a roof pillar 5, a rear pillar 4, a front pillar 2, a center pillar 3, a side sill 6, and the like. The roof pillar 5 extends above a vehicle cabin space of a vehicle along the vehicle length direction and forms a side of a vehicle roof. The side sill 6 extends below the side of the vehicle along the vehicle length direction. The front pillar 2 has a lower end coupled to a front end of the side sill 6 and an upper end coupled to a front end of the roof pillar 5. The front pillar 2 forms a front that configures the vehicle cabin space of the vehicle and is disposed to support a side of a windshield. The rear pillar 4 has a lower end coupled to a rear end of the side sill 6 and an upper end coupled to a rear end of the roof pillar 5. The center pillar 3 has a lower end coupled to a center, in the vehicle length direction, of the side sill 6 and an upper end coupled to a center, in the vehicle length direction, of the roof pillar 5.

An opening for a front door is formed between the side sill 6, the roof pillar 5, the front pillar 2, and the center pillar 3. In addition, an opening for a rear door is formed between the side sill 6, the roof pillar 5, the rear pillar 4, and the center pillar 3. Each member configuring the vehicle body side structure 1 may be configured with multiple members. For example, each member may be configured such that an outer panel in the vehicle width direction is bonded to an inner panel in the vehicle width direction.

In the vehicle body side structure 1, the center pillar 3 corresponds to a vehicle body structural member in the present embodiment. A longitudinal direction of the center pillar 3 is the vehicle height direction, and the center pillar 3 is formed into a generally cylindrical shape. The center pillar 3 has a roof pillar coupling part 16 provided on the upper end, a side sill coupling part 14 provided on the lower end, and a pillar main body 12 located between the roof pillar coupling part 16 and the side sill coupling part 14. In the present embodiment, the center pillar 3 is formed from a carbon fiber-reinforced resin (CFRP).

2. Center Pillar (Vehicle Body Structural Member)

Configurations of the center pillar 3 according to the present embodiment will next be described in detail.

2-1. Basic Configurations

Figure 2:
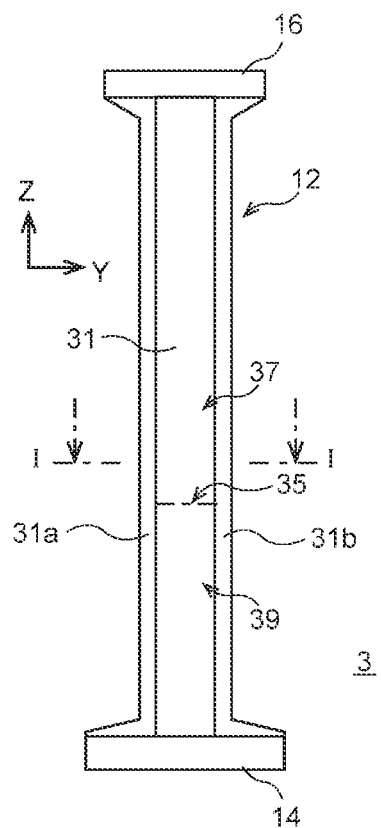
FIG. 2 is an appearance diagram of the vehicle body structural member (center pillar) according to the present embodiment from a vehicle body outward direction.
Figure 3:
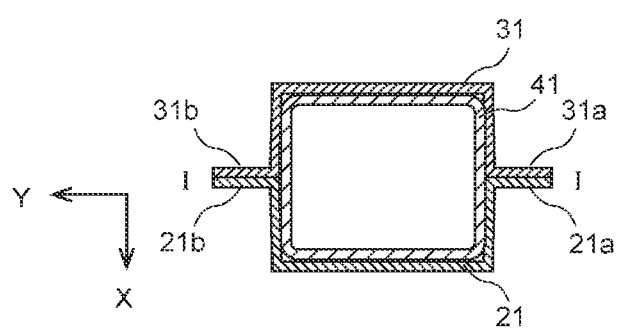
FIG. 3 is an arrow view of a I-I cross-section of the center pillar illustrated in FIG. 2.

FIGS. 2 and 3 illustrate a basic configuration example of the center pillar 3 according to the present embodiment. The center pillar 3 illustrated in FIGS. 2 and 3 is a simplified view of the center pillar 3 of the vehicle body side structure 1 illustrated in FIG. 1. FIG. 2 illustrates an appearance diagram of the center pillar 3 from the vehicle body outward direction. FIG. 3 is an arrow view of a I-I cross-section of the center pillar 3 illustrated in FIG. 2.

In the example of the present embodiment, the center pillar 3 includes an inner member 21 located inside of the vehicle body, an outer member 31 located outside of the vehicle body, and a cylindrical member 41 located between the inner member 21 and the outer member 31. The inner member 21, the outer member 31, and the cylindrical member 41 are each formed from the CFRP.

The inner member 21 and the outer member 31 each have a part configuring the roof pillar coupling part 16 on an upper end and a part configuring the side sill coupling part 14 on a lower end. In addition, the inner member 21 has flanges 21a, 21b on both sides, in the vehicle length direction, of an intermediate member configuring the pillar main body 12. The outer member 31 has flanges 31a, 31b on both sides, in the vehicle length direction, of the intermediate member configuring the pillar main body 12. The cylindrical member 41 is formed into a hollow cylindrical shape to have a stereoscopic shape corresponding to a shape of the pillar main body 12.

The pillar main body 12 has a generally cylindrical shape with an axial direction extending along the vehicle height direction. The pillar main body 12 is configured as a compact having a cylindrical closed cross-section. That is, the cylindrical member 41 is put between the inner member 21 and the outer member 31, inner surfaces of the inner member 21 and the outer member 31 are bonded to an outer surface of the cylindrical member 41, and the flanges 21a, 21b of the inner member 21 are bonded to the flanges 31a, 31b of the outer member 31 (refer to FIG. 3). The inner member 21 and the outer member 31 are bonded to the cylindrical member 41 and the flanges 21a, 21b are bonded to the flanges 31a, 31b of the outer member 31 by, for example, an adhesive. The flanges 21a, 21b and the flanges 31a, 31b bonded to one another can be used as, for example, doorstops of the front door and the rear door.

The cylindrical member 41 is formed with a fiber-reinforced resin where carbon fibers are impregnated with a thermoplastic resin or a thermosetting resin. Examples of the thermoplastic resin include a polyethylene resin, a polypropylene resin, a polyvinyl chloride resin, an ABS resin (acrylonitrile-butadiene-styrene copolymer synthetic resin), a polystyrene resin, an AS resin (acrylonitrile-styrene copolymer synthetic resin), a polyamide resin, a polyacetal resin, a polycarbonate resin, a polyester resin, a PPS (polyphenylene sulfide) resin, a fluorocarbon resin, a polyetherimide resin, a polyether ketone resin, and a polyimide resin.

One or a mixture of two types or more of the thermoplastic resins can be used as a matrix resin. Alternatively, the matrix resin may be a copolymer of these thermoplastic resins. When the mixture of the thermoplastic resins is used, a compatibilizer may be added to the mixture. Furthermore, a fire retardant such as a bromine-based fire retardant, a silicon-based fire retardant, or red phosphorus may be added to the thermoplastic resin(s).

Examples of the thermosetting resin include an epoxy resin, an unsaturated polyester resin, a vinyl ester resin, a phenol resin, a polyurethane resin, and a silicon resin. One or a mixture of two types or more of the thermosetting resins can be used as the matrix resin. When one or more of these thermosetting resins are used, a curing agent and a reaction accelerator may be added as appropriate to the thermosetting resin(s).

The carbon fibers may include fibers oriented in the axial direction and those oriented in the direction crossing the axial direction at an appropriate ratio. A tensile stress generated during input of a collision load of a side collision is adjusted depending on an amount of the fibers oriented in the axial direction. A rigidity against the collision load of the side collision is adjusted and an absorbed amount of collision energy is adjusted depending on an amount of the fibers oriented in the direction crossing the axial direction. Since the cylindrical member 41 is the compact having the cylindrical closed cross-section, it is possible to maintain not only the continuity of the fibers in the axial direction (vehicle longitudinal direction) but also the continuity of the fibers in the circumferential direction around an axis. Therefore, it is possible to improve the rigidity against the collision load of the side collision.

The cylindrical member 41 may be a stacked body where CFRP sheets (prepregs) are stacked by a lay-up method, or a structure where carbon fibers are wound by a winding method and cured along with a matrix resin. The cylindrical member 41 may be a hollow tubular member or a solid member filled with a resin or the other appropriate material. Furthermore, the cylindrical member 41 may contain short fibers other than continuous fibers and may contain fibers other than carbon fibers as reinforcement fibers.

The inner member 21 and the outer member 31 are, like the cylindrical member 41, formed with the fiber-reinforced resin where carbon fibers are impregnated with the thermoplastic resin or the thermosetting resin. The carbon fibers may include fibers oriented in the axial direction and those oriented in the direction crossing the axial direction at an appropriate ratio. However, directions of orientation of the carbon fibers may be one direction or different directions. Furthermore, the inner member 21 and the outer member 31 also may contain short fibers other than continuous fibers and may contain fibers other than carbon fibers as reinforcement fibers.

As illustrated in FIG. 3, the inner member 21 and the outer member 31 of the center pillar 3 in the present embodiment each have a hat cross-section and the cylindrical member 41 is disposed in a recessed region between the flanges 21a, 21b, 31a, 31b on both sides in the vehicle length direction. A bottom surface of the recessed region of one or more of the inner member 21 and the outer member 31 is bonded to the outer surface of the cylindrical member 41.

The configurations of the center pillar 3 are not limited to the example in which the center pillar 3 is configured with the inner member 21, the outer member 31, and the cylindrical member 41. The center pillar 3 may be configured with one cylindrical member or include other members. In addition, the center pillar 3 may not include the flanges 21a, 21b, 31a, 31b.

2-2. Torsional Deformation Structure

Next, a structure where the center pillar 3 has torsions during the input of a collision load of a side collision (hereinafter, "torsional deformation structure") will be described in detail.

As illustrated in FIG. 2, the center pillar 3 includes a break scheduled part 35 provided on a surface closer to the outer member 31 that is to serve as a load input surface to which the collision load is expected to be input, undergoing a brittle fracture during the input of the collision load, and dividing the load input surface into a first region and a second region on both sides in a predetermined first direction. In an example, the center pillar 3 includes the break scheduled part 35 dividing the surface closer to the outer member 31 (load input surface) into a first region 37 on an upper side in the vehicle height direction (Z direction) and a second region 39 on a lower side in the vehicle height direction during the input of the collision load of the side collision. The load input surface means not an outer surface of the outer member 31 but elements of the outer member 31 and the cylindrical member 41 located outside of the vehicle body in the center pillar 3.

The break scheduled part 35 is provided near a height to which the collision load of the side collision is input with reference to, for example, a height of a bumper of a passenger vehicle. The break scheduled part 35 is formed by causing reinforcement fibers either in part or in entirety to be discontinuous between the first region 37 and the second region 39. In a more specific example, the outer member 31 and the cylindrical member 41 are configured with continuous fibers. However, part of or the entirety of the continuous fibers are discontinuous in the break scheduled part 35 between the first region 37 and the second region 39. As a result, the break scheduled part 35 gets brittle and can undergo a brittle fracture during the input of the collision load of the side collision. This makes it difficult to transmit a stress acting on the first region 37 and a stress acting on the second region 39 to each other; thus, the first region 37 and the second region 39 are deformable in different directions.

However, the structural member made of the fiber-reinforced resin exhibits high strength against a compressive stress or a tensile stress acting in a direction of orientation of the continuous fibers. Therefore, it is desirable that part of the continuous fibers is disposed across the first region 37 and the second region 39 and that the rest of the continuous fibers is discontinuous between the first region 37 and the second region 39 so that the strength of the center pillar 3 can be ensured to a predetermined extent. For example, to make part of the continuous fibers discontinuous on the load input surface of the center pillar 3 to which the collision load is to be input, CFRP sheets may be stacked with a demarcation put in a part corresponding to the break scheduled part 35 when forming, for example, one or more of the outer member 31 and the cylindrical member 41. However, making the continuous fibers discontinuous is not limited to a specific method.

Furthermore, the center pillar 3 according to the present embodiment is configured such that each of the first region 37 and the second region 39 contains the continuous fibers oriented in a second direction inclined at a predetermined angle with respect to the axial direction of the center pillar 3 corresponding to the vehicle height direction (first direction) at the highest ratio to the entire fibers contained in each of the first region 37 and the second region 39.

Figure 4:
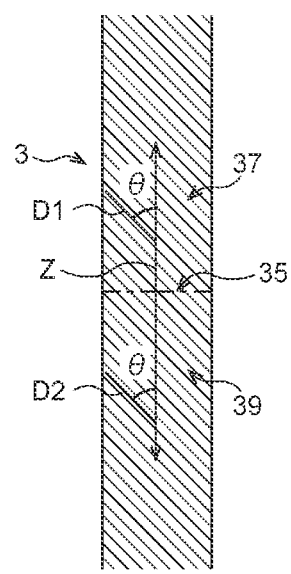
FIG. 4 is a schematic diagram of the surroundings of a break scheduled part of the center pillar illustrated in FIG. 2.
Figure 5:
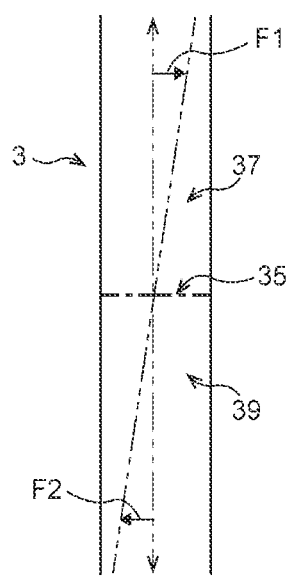
FIG. 5 illustrates an action of the vehicle body structural member according to the present embodiment.

FIG. 4 is a schematic diagram of the surroundings of the break scheduled part 35 of the center pillar 3 illustrated in FIG. 2. As illustrated in FIG. 4, the first region 37 and the second region 39 are each configured to contain the continuous fibers oriented in the second direction D1, D2 inclined at the predetermined angle θ with respect to the vehicle height direction (Z direction) at the highest ratio. The second direction D1 of the continuous fibers in the first region 37 and the second direction D2 of the continuous fibers in the second region 39 are inclined in the same direction with respect to the axial direction of the center pillar 3. Among the continuous fibers contained in the first region 37 and the second region 39, those inclined at the predetermined angle θ with respect to the vehicle height direction are dominant. Therefore, during the input of the collision load of the side collision, it is possible to generate the torsional deformation in the first region 37 and the second region 39 on both sides across the break scheduled part 35. In one example, as illustrated in FIG. 5, reverse shear stresses F1, F2 in the vehicle length direction are generated in the first region 37 and the second region 39 on the load input surface using the collision load input during the side collision; thus, it is possible to generate the torsional deformation in the center pillar 3.

"To contain the continuous fibers oriented in the second direction D1, D2 inclined at the predetermined angle θ at the highest ratio" means that each of the first region 37 and the second region 39 contains the continuous fibers oriented in the same direction inclined with respect to the axial direction of the center pillar 3 at the highest ratio to the entire continuous fibers configuring each of the first region 37 and the second region 39. In other words, the continuous fibers oriented in the same direction inclined with respect to the axial direction of the center pillar 3 may not be equally oriented in parallel and may be oriented at different inclination angles. It is thereby possible to generate the torsional deformations in the first region 37 and the second region 39 to the same extent during the input of the collision load.

In this case, the predetermined angle θ may be in a range from 40 to 50 degrees. In other words, designing the direction of the orientation of the continuous fibers at the highest content to nearly 45 degrees with respect to the axial direction of the center pillar 3 allows for enhanced assuredness for generating the torsional deformations during the input of the collision load. It is noted that inclinations of the direction of the orientation of the continuous fibers at the highest content may be opposite to those illustrated in FIG. 4. In this case, the torsions are generated reversely.

Figure 6:
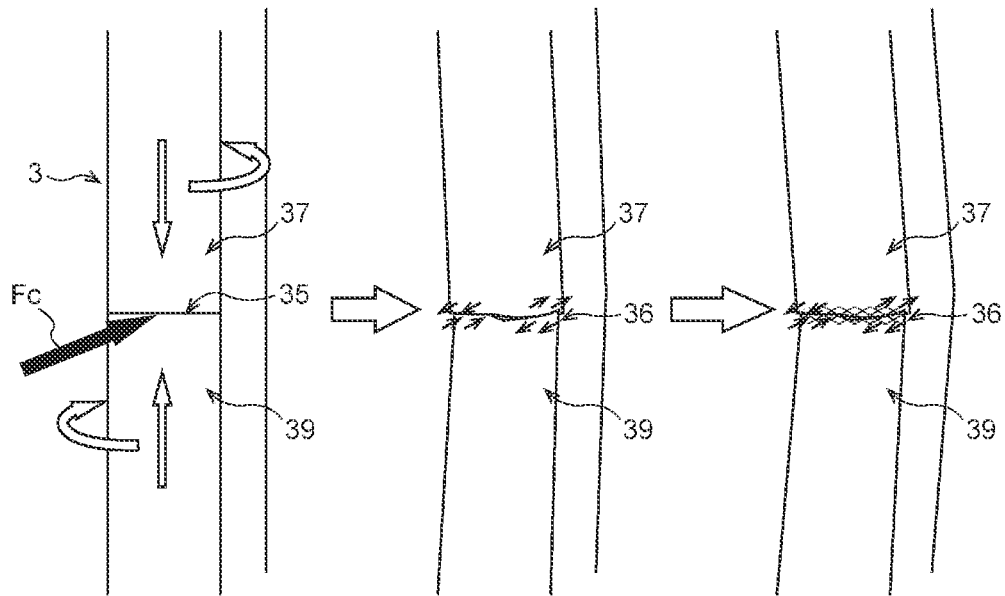
FIG. 6 illustrates an action of a torsional deformation structure of the vehicle body structural member according to the present embodiment.

FIG. 6 illustrates an action of the torsional deformation structure of the center pillar 3.

When a collision load Fc of the side collision is input near the break scheduled part 35 on the load input surface of the center pillar 3, the center pillar 3 bends around the break scheduled part 35. As a result, compressive stresses toward the break scheduled part 35 are generated in the first region 37 and the second region 39, respectively. At the same time, shear stresses generated by the inclinations of the continuous fibers contained in the first region 37 and the second region 39 cause the torsional deformations in the first region 37 and the second region 39 on both sides across the break scheduled part 35. As a result, the break scheduled part 35 breaks.

The continuity of the continuous fibers is low in a breaking member 36 resulting from breaking of the break scheduled part 35; thus, the first region 37 and the second region 39 cross each other in a breaking member 36. In one example, in the breaking member 36, an outer surface of the first region 37 of the center pillar 3 undergoes a torsion rearward in the vehicle length direction and an outer surface of the second region 39 undergoes a torsion forward in the vehicle length direction. This results in a state in which an end of the first region 37 crosses an end of the second region 39 in the breaking member 36.

Furthermore, when the collision load continues to be input, crushing progresses with the first region 37 and the second region 39 biting into each other in the breaking member 36. Therefore, the break and the crushing enable the load input surface of the center pillar 3 to absorb the collision energy.

Without the configurations of generating the torsional deformations during the input of the collision load to the load input surface, the collision energy is absorbed simply by the break or buckling break. With the configurations of the center pillar 3 according to the present embodiment, therefore, it is possible to improve characteristics for absorbing the collision energy.

3. Other Configuration Examples

The configurations of generating the torsional deformations during the input of the collision load are not limited to the example in the embodiment described above and can be modified variously. Some modified examples of the torsional deformation structure will now be described.

3-1. First Modified Example

Figure 7:
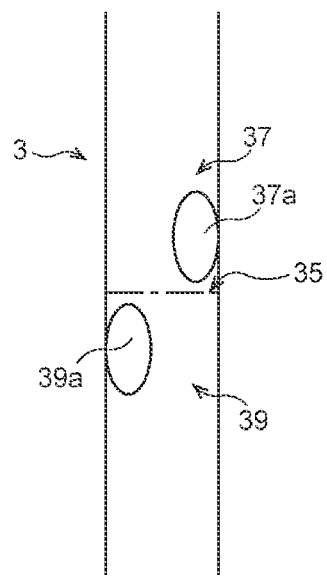
FIG. 7 illustrates a first modified example of the torsional deformation structure according to the present embodiment.

FIG. 7 illustrates a first modified example of the torsional deformation structure according to the present embodiment. FIG. 7 corresponds to FIG. 4 illustrating the above embodiment and is a schematic diagram of the surroundings of the break scheduled part 35 of the center pillar 3 in a view from the outside of the vehicle body. In the first modified example, contact locations, i.e., load input locations are controlled during the input of the collision load of the side collision so that the torsional deformations can be generated in the center pillar 3.

In one example, in the center pillar 3 according to the first modified example, the first region 37 and the second region 39 have projecting surfaces 37*a*, 39*a* projecting toward the input of the collision load, i.e., in the vehicle body outward direction at diagonal positions across the break scheduled part 35, respectively. Owing to this, during the side collision, the collision load from the other vehicle or the like is input first from the projecting surfaces 37*a*, 39*a*. As a result, during the input of the collision load, the load acts on the diagonal positions across the break scheduled part 35 to generate the torsional deformations in the first region 37 and the second region 39. Therefore, in accordance with the action described with reference to FIG. 6, the crushing progresses with the first region 37 and the second region 39 biting into each other in the breaking member 36. Therefore, the break and the crushing enable the load input surface of the center pillar 3 to absorb the collision energy.

In the example illustrated in FIG. 7, the load input locations are controlled by providing the projecting surfaces 37*a*, 39*a* protruding toward an input side of the collision load, i.e., in the vehicle body outward direction at the diagonal positions across the break scheduled part 35 in the first region 37 and the second region 39, respectively. However, the first modified example is not limited to such an example. The first region 37 and the second region 39 may have recessed surfaces recessed toward an opposite side to the input side of the collision load, i.e., in a vehicle body inward direction at the diagonal positions across the break scheduled part 35. This similarly allows for the collision load input locations at the diagonal positions across the break scheduled part 35.

3-2. Second Modified Example

Figure 8:
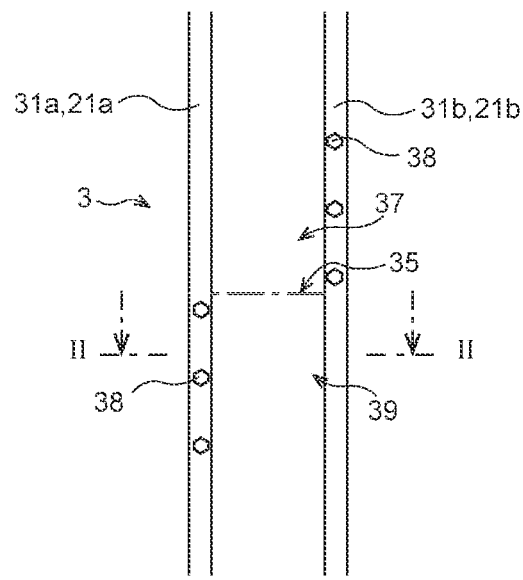
FIG. 8 illustrates a second modified example of the torsional deformation structure according to the present embodiment.
Figure 9:
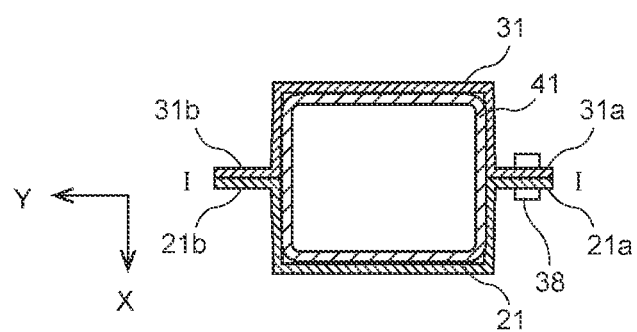
FIG. 9 is an arrow view of a II-II cross-section of the center pillar illustrated in FIG. 8.

FIGS. 8 and 9 illustrate a second modified example of the torsional deformation structure. FIG. 8 corresponds to FIG. 4 illustrating the above embodiment and is a schematic diagram of the surroundings of the break scheduled part 35 of the center pillar 3 in a view from the outside of the vehicle body. FIG. 9 is an arrow view of a II-II cross-section of the center pillar 3 illustrated in FIG. 8. In the second modified example, among bonded parts between the inner member 21 and the outer member 31, those located at the diagonal positions across the break scheduled part 35 are set higher in bonding strength than the other bonded parts so that the torsional deformations can be generated in the center pillar 3.

In one example, in the center pillar 3 according to the second modified example, the inner member 21 and the outer member 31 are bonded to each other using the flanges 21*a*, 21*b* and the flanges 31*a*, 31*b* provided on both sides in the vehicle length direction as the bonded parts, respectively. The bonded parts are bonded by the adhesive. In addition, among the bonded parts, those located at the diagonal positions across the break scheduled part 35 are strongly bonded by bonding bolts 38 in addition to the adhesive; thus, the bonding strengths of these bonded parts are increased. Owing to this, during the input of the collision load of the side collision, a bonding state of the bonded parts with the bonding strengths increased by the bonding bolts 38 is maintained, while the other bonded parts are prone to the break by peeling or the like. As a result, in accordance with the action described with reference to FIG. 6, the torsional deformations are generated in the first region 37 and the second region 39, and the crushing progresses with the first region 37 and the second region 39 biting into each other in the breaking member 36. Therefore, the break and the crushing enable the load input surface of the center pillar 3 to absorb the collision energy.

Increasing the bonding strengths of the bonded parts located at the diagonal positions across the break scheduled part 35 is not limited to the method using the bonding bolts. The bonding strengths may be increased at the positions using other bonding members or by changing adhesive forces of the adhesive. Alternatively, even with the bonding bolts, the bonding strengths of the positions may be increased by, for example, changing the number of bonding bolts (placement densities) or changing diameters of the bonding bolts depending on the bonded parts. In another alternative, the bonding strengths may be increased at these positions by adopting a combination of two or more bonding methods described as the examples.

As described so far, the center pillar 3 to serve as the vehicle body structural member according to the present embodiment includes the break scheduled part 35 provided on the load input surface to which the collision load is expected to be input, and configured to undergo a brittle fracture during the input of the collision load and to divide the load input surface into the first region 37 and the second region 39 on both sides in the vehicle height direction, and has the torsional deformation structure for generating torsions in the first region 37 and the second region 39 on both sides across the break scheduled part 35 during the input of the collision load. Owing to this, during the input of the collision load of the side collision, the crushing progresses with the first region 37 and the second region 39 biting into each other in the breaking member 36. The break and the crushing thereby enable the load input surface of the center pillar 3 to absorb the collision energy. In one embodiment, the center pillar 3 may serve as a "vehicle body structural member".

Furthermore, the center pillar 3 according to the present embodiment is configured to cause the fibers to be discontinuous in part or in entirety between the first region 37 and the second region 39 in the break scheduled part 35. Owing to this, it is difficult to transmit the stress acting on the first region 37 and the stress acting on the second region 39 to each other; thus, the first region 37 and the second region 39 are deformable in different directions. Therefore, it is possible to improve the assuredness for generating the torsional deformations in the first region 37 and the second region 39.

While the embodiment of the disclosure has been described in detail with reference to the accompanying drawings, the disclosure is not limited to the embodiment. It is evident that a person having ordinary skill in the art to which the disclosure pertains could conceive of examples of various modifications or revisions within the scope of the technical concept set forth in the claims. It would be understood that these modifications or revisions naturally fall in the technical range of the disclosure. Furthermore, modes of combinations of the embodiment with the modified examples naturally fall in the technical scope of the disclosure.

For example, the center pillar 3 has been described as an example of the vehicle body structural member in the embodiment, the vehicle body structural member to which the technique of the disclosure is applicable is not limited to the center pillar. The technique of the disclosure is applicable to any structural member configuring a vehicle body structure and desired to serve to receive a collision load and absorb collision energy unless conflicting features occur.

As described so far, the technique of the disclosure enables improved characteristics of absorbing the collision energy in the vehicle body structural member using the fiber-reinforced resin composite.

The invention claimed is:

1. A vehicle body structural member formed from a fiber-reinforced resin composite, the vehicle body structural member comprising
    a break scheduled part provided on a load input surface to which a collision load is expected to be input, and configured to, when the collision load is input, undergo a brittle fracture and divide the load input surface into a first region and a second region on both sides respectively in a predetermined first direction, wherein
    when the collision load is input, a torsion is generated in each of the first region and the second region across the break scheduled part, and
    wherein fibers are discontinuous in part or in entirety between the first region and the second region in the break scheduled part on the load input surface.

2. The vehicle body structural member according to claim 1, wherein the first region and the second region are each configured to contain continuous fibers oriented in a second direction inclined at a predetermined angle with respect to the predetermined first direction at a highest ratio to entire fibers contained in the first region and the second region.

3. The vehicle body structural member according to claim 1, wherein the first region and the second region respectively comprise projecting surfaces or recessed surfaces at diagonal positions across the break scheduled part, the projecting surfaces protruding toward an input side to which the collision load is input, the recessed surfaces being recessed toward an opposite side to the input side.

4. The vehicle body structural member according to claim 1, wherein
    the vehicle body structural member comprises an outer member and an inner member that are bonded, the outer member being located on an input side to which the collision load is input and including the break scheduled part, the inner member being located on an opposite side to the input side, and
    the vehicle body structural member is configured such that bonding strengths of bonded parts located at diagonal positions across the break scheduled part are higher or lower than bonding strengths of other bonded parts.

5. A vehicle body structural member formed from a fiber-reinforced resin composite, the vehicle body structural member comprising
    a break scheduled part provided on a load input surface to which a collision load is expected to be input, and configured to, when the collision load is input, undergo a brittle fracture and divide the load input surface into a first region and a second region on both sides respectively in a predetermined first direction, wherein
    when the collision load is input, a torsion is generated in each of the first region and the second region across the break scheduled part, and
    wherein the vehicle body structural member is a vehicle body pillar structure.

6. The vehicle body structural member according to claim 5, wherein fibers are discontinuous in part or in entirety between the first region and the second region in the break scheduled part on the load input surface.

7. The vehicle body structural member according to claim 5, wherein the first region and the second region are each configured to contain continuous fibers oriented in a second direction inclined at a predetermined angle with respect to the predetermined first direction at a highest ratio to entire fibers contained in the first region and the second region.

8. The vehicle body structural member according to claim 5, wherein the first region and the second region respectively comprise projecting surfaces or recessed surfaces at diagonal positions across the break scheduled part, the projecting surfaces protruding toward an input side to which the collision load is input, the recessed surfaces being recessed toward an opposite side to the input side.

9. The vehicle body structural member according to claim 5, wherein
the vehicle body structural member comprises an outer member and an inner member that are bonded, the outer member being located on an input side to which the collision load is input and including the break scheduled part, the inner member being located on an opposite side to the input side, and
the vehicle body structural member is configured such that bonding strengths of bonded parts located at diagonal positions across the break scheduled part are higher or lower than bonding strengths of other bonded parts.

10. The vehicle body structural member according to claim 5, wherein the vehicle pillar structure is a center pillar of the vehicle.

* * * * *